United States Patent
Prasad

(10) Patent No.: US 8,152,890 B2
(45) Date of Patent: Apr. 10, 2012

(54) KIMBERLITE BASED FERTILIZER PRODUCTS

(75) Inventor: Durga Yandapalli Prasad, Andhra Pradesh (IN)

(73) Assignee: Bijam Biosciences Private Limited, Hyderabad (IN)

(*) Notice: Subject to any disclaimer, the term of this patent is extended or adjusted under 35 U.S.C. 154(b) by 226 days.

(21) Appl. No.: 12/312,337

(22) PCT Filed: Nov. 5, 2007

(86) PCT No.: PCT/IB2007/003342
§ 371 (c)(1),
(2), (4) Date: Oct. 6, 2009

(87) PCT Pub. No.: WO2008/056222
PCT Pub. Date: May 15, 2008

(65) Prior Publication Data
US 2010/0018269 A1    Jan. 28, 2010

(30) Foreign Application Priority Data
Nov. 6, 2006    (IN) .................... 2039/CHE/2006

(51) Int. Cl.
*C05F 11/02*    (2006.01)
*C05B 7/00*    (2006.01)

(52) U.S. Cl. ........... 71/24; 71/33; 71/34; 71/35; 71/52; 71/53; 71/62; 71/63; 71/903

(58) Field of Classification Search ............... 71/30–63, 71/903, 24
See application file for complete search history.

(56) References Cited

U.S. PATENT DOCUMENTS
2002/0011088 A1 *   1/2002   Peacock et al. ............. 71/64.02

FOREIGN PATENT DOCUMENTS
WO   WO 2005/097947 A1   10/2005

OTHER PUBLICATIONS

International Search dated Oct. 15, 2008, for International Application No. PCT/IB2007/003342.
Jain et al., "Response and economic viability of wheat (*Triticum aestivum*) to kimberlite along with chemical fertilizers and phosphate-solubilizing bacteria", Crop Research, 1997, vol. 14(3), pp. 427-431.
Weerasuriya et al., "Acidulated pegmatitic mica: A promising new multi-nutrient mineral fertilizer", Fertilizer Research, 1993., vol. 34, pp. 67-77.

* cited by examiner

*Primary Examiner* — Wayne Langel
(74) *Attorney, Agent, or Firm* — Foley & Lardner LLP

(57) ABSTRACT

Kimberlite based fertilizer products are produced by treating micronized Kimberlite with alkali or first acid then alkali or by mixing the micronized kimberlite with DAP or NPK fertilizer.

9 Claims, 2 Drawing Sheets

KIMBERLITE BASED FERTILIZER PRODUCTS

FIELD OF THE INVENTION

Figure 1:
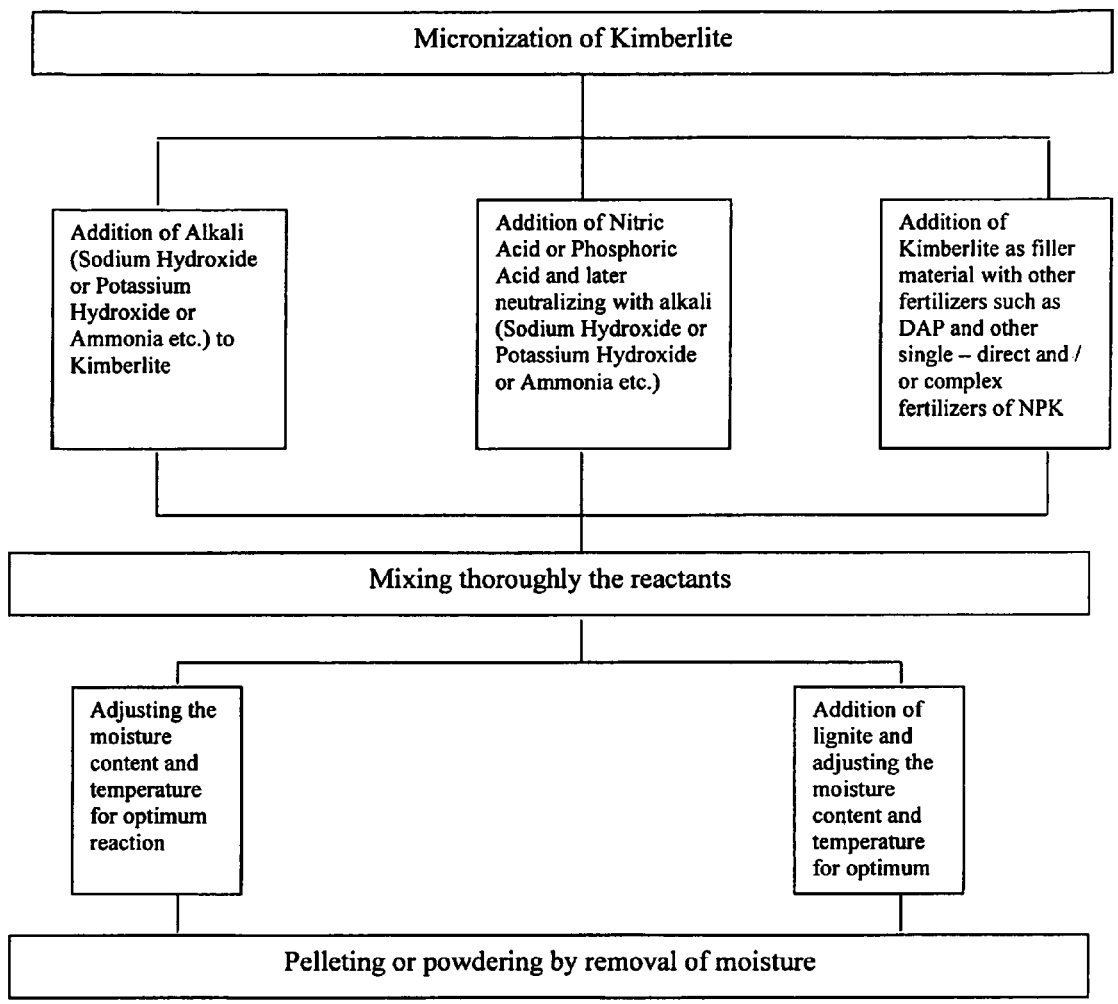
Figure 2:
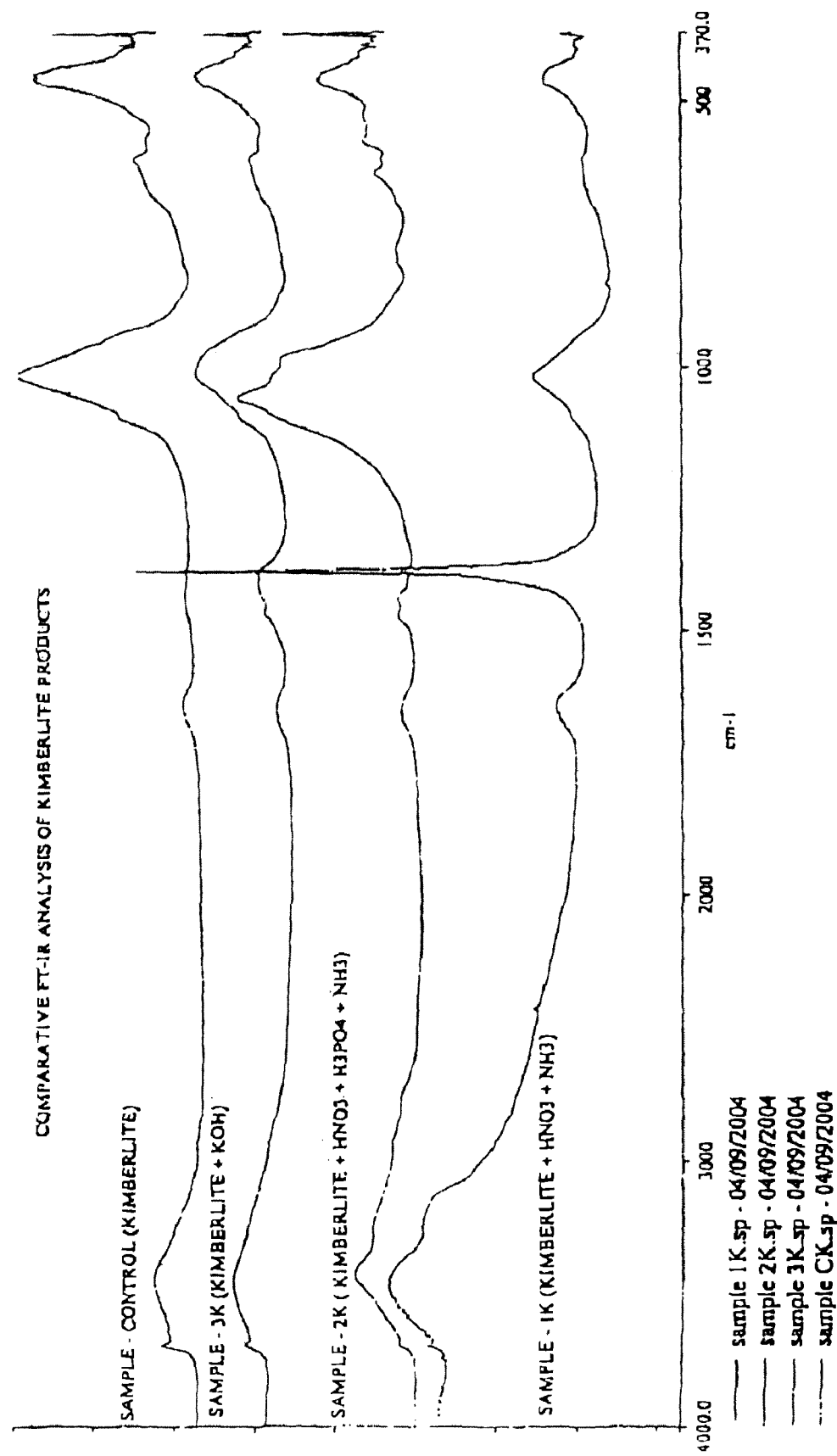

In general, this invention relates to the field of material sciences. In particular, this invention pertains to production of fertilizers from Kimberlite. This invention also relates to a method of manufacturing fertilizer products from Kimberlite having applications in the field of agriculture.

BACK GROUND OF THE INVENTION

Diamonds are formed when carbon deposits are exposed to high pressure and temperature for prolonged periods. Deep within the earth, there are regions that are at a high enough temperature and pressure that the formation of diamonds is thermo dynamically possible. Under the continental crust, diamonds from starting at depths of about 90 miles where pressure is roughly 5 giga pascals and the temperature is around 2200° Fahrenheit. Diamonds are mined in 'kimberlite pipe'. Kimberlite is an ultra potassic, ultra mafic, igneous rock composed of garnet, olivine, phlogopite, and pyroxene with a variety of other trace minerals. Kimberlite occurs in the earth's crust in vertical structures known as Kimberlite pipes. India is host to the largest known number of proterozoic Kimberlite clan rocks.

Large amounts of Kimberlite is required to produce a carat of diamond. Few tonnes are required to yield a carat of diamond. Large amount of Kimberlite after removal of diamond is available around the globe without any appropriate utility. Kimberlite contains magnesium, trace metals and silica in rich proportions. Therefore, present invention objective is to invent method of producing Kimberlite based fertilizers.

OBJECTS OF THE INVENTION

Accordingly, the primary object of this invention is to invent fertilizers products from Kimberlite which can be used as fertilizer.

Another object of this invention is to develop production method of Kimberlite based fertilizer products. Yet another objective of this invention is to invent Kimberlite based products with organic nature. Still another objective of this invention is to provide a necessary method for production of organic based Kimberlite products.

SUMMARY OF THE INVENTION

To meet the above objects and others, present invention provides novel fertilizer products from Kimberlite having utility as nutrients to supply silica, magnesium, trace elements with or without organic substances, and also having scope to design products with various combinations with other fertilizers and/or plant based nutrients.

DETAILED DESCRIPTION OF THE INVENTION

Now this invention will be described in detail so as to illustrate and explain various salient features of the invention. One embodiment of the invention is to provide Kimberlite based fertilizer products by reacting and/or blending with alkali. Another embodiment of the present invention relates to a method of production of organic based Kimberlite products by blending with lignite along with alkali.

In a preferred embodiment, the present invention provides method of producing Kimberlite based fertilizer products and the said method comprising the following steps:
(a) Micronization of Kimberlite
(b) Addition of Alkali (Sodium Hydroxide or Potassium Hydroxide or Ammonia etc.) to Kimberlite
(or)
Addition of Nitric Acid or Phosphoric Acid and later neutralizing with alkali (Sodium
Hydroxide or Potassium Hydroxide or Ammonia etc.)
(or)
Addition of Kimberlite as filler material with other fertilizers such as DAP and other single-direct and/or complex fertilizers of NPK.
(c) Mixing thoroughly the reactants
(d) Adjusting the moisture content and temperature for optimum reaction
(or)
Addition of lignite and adjusting the moisture content and temperature for optimum reaction
(e) Pelleting or powdering by removal of moisture

BRIEF DESCRIPTION OF THE ACCOMPANYING DRAWINGS

FIG. (1) relates to the various steps involved in the manufacturing process of various fertilizer products from Kimberlite.

FIG. (2) relates to the comparative FTIR analysis of Kimberlite, Kimberlite treated with alkali, Kimberlite treated with Nitric Acid, Phosphoric Acid and Ammonia, Kimberlite treated with Nitric Acid and Ammonia.

Now the invention will be described in the following description. The nature of the invention and the manner in which the invention is to be carried out will be described in detail.

FIG. (1) relates to the various steps involved in the manufacturing process of various types of fertilizer products from Kimberlite.

FIG. (2) relates to the comparative FTIR analysis of Kimberlite, Kimberlite treated with alkali, Kimberlite treated with Nitric Acid, Phosphoric Acid and Ammonia, Kimberlite treated with Nitric Acid and Ammonia. The characteristic absorbance of the peaks with variability was observed for the treatments in relation to non-treated Kimberlite.

Now the applicant provides following specific description by way of examples and illustrations of the invention and this should not be construed to limit the scope of the invention in any manner.

Alkali (Sodium Hydroxide or Potassium Hydroxide or Ammonia etc.) to Kimberlite was added at a ratio of 1:3 to 1:50 (w/w). The mixture of alkali and kimberlite was blended by grinding properly, then water was added appropriately to mix thoroughly. The resultant material was pelleted for usage as the fertilizer.

Nitric Acid or Phosphoric Acid was added to Kimberlite (5 to 50% v/w) and later neutralizing with alkali (Sodium Hydroxide or Potassium Hydroxide or Ammonia etc.) was done.

Kimberlite was added as filler material with other fertilizers such as DAP and other single-direct and/or complex fertilizers of NPK.

Lignite was added to Kimberlite at a ratio of 10:1 to 1:10 and later alkali was added to the mixture of lignite and kimberlite at a ratio of 1:3 to 1:50 (w/w). The mixture of alkali and lignite-kimberlite was blended by grinding properly, then water was added appropriately to mix thoroughly.

When kimberlite based fertilizer products were tested on various agricultural crops enhanced yields significantly. When silica supplementation has been done through these kimberlite based products, on crops, it imparted resistance to diseases apart from yield enhancement.

Present invention explains production of various types of Kimberlite based fertilizer products for enhancement of yield of various agricultural crops.

The results derived from the present invention gives a scope of using Kimberlite based fertilizer products for effective and economic integrated fertilizer management.

This invention has been explained by way of few examples and is not restricted to various combinations and feasibilities of the basic aspect.

The invention claimed is:

1. A plant nutrient composition comprising:
   a first component comprising alkali treated kimberlite; and
   a second component comprising lignite;
   wherein the ratio between the first and the second component is in the range of 10:1 to 1:10 on a weight by weight basis.

2. A process for preparing the plant nutrient composition as claimed in claim 1, said process comprising the steps:
   a. subjecting kimberlite to a micronization process to obtain micronized kimberlite;
   b. adding an alkali to the micronized kimberlite to obtain a mixture;
   c. mixing thoroughly the mixture thus obtained in step (b) and adjusting moisture content and temperature of the same to obtain a reaction mixture;
   d. adding lignite to the reaction mixture thus obtained in step (c), a quantity of lignite being such that the ratio between the reaction mixture and lignite is in the range of 10:1 to 1:10 on a weight by weight basis; and
   e. subjecting a product thus obtained in step (d) to a pelletizing or a powdering procedure to obtain the plant nutrient composition.

3. The process according to claim 2, wherein the alkali is selected from the group consisting of sodium hydroxide and potassium hydroxide.

4. The plant nutrient composition comprising:
   a first component comprising kimberlite treated with nitric acid and alkali; and
   a second component comprising lignite;
   wherein the ratio between the first and the second component is in the range of 10:1 to 1:10 on a weight by weight basis.

5. A process for preparing the plant nutrient composition as claimed in claim 4, said process comprising the steps:
   a. subjecting kimberlite to a micronization process to obtain micronized kimberlite;
   b. adding nitric acid to the micronized kimberlite and thereafter an alkali to obtain a mixture;
   c. mixing thoroughly the mixture thus obtained in step (b) and adjusting moisture content and temperature of the same to obtain a reaction mixture;
   d. adding lignite to the reaction mixture thus obtained in step (c), a quantity of lignite being such that the ratio between the reaction mixture and lignite is in the range of 10:1 to 1:10 on a weight by weight basis; and
   e. subjecting a product thus obtained in step (d) to a pelletizing or a powdering procedure to obtain the plant nutrient composition.

6. The process according to claim 5, wherein the alkali is selected from the group consisting of sodium hydroxide and potassium hydroxide.

7. The plant nutrient composition comprising:
   a first component comprising kimberlite treated with phosphoric acid and alkali; and
   a second component comprising lignite;
   wherein the ratio between the first and the second component is in the range of 10:1 to 1:10 on a weight by weight basis.

8. A process for preparing the plant nutrient composition as claimed in claim 7, said process comprising the steps:
   a. subjecting kimberlite to a micronization process to obtain micronized kimberlite;
   b. adding phosphoric acid to the micronized kimberlite and thereafter an alkali to obtain a mixture;
   c. mixing thoroughly the mixture thus obtained in step (b) and adjusting moisture content and temperature of the same to obtain a reaction mixture:
   d. adding lignite to the reaction mixture thus obtained in step (c), a quantity of lignite being such that the ratio between the reaction mixture and lignite is in the range of 10:1 to 1:10 on a weight by weight basis; and
   e. subjecting a product thus obtained in step (d) to a pelletizing or a powdering procedure to obtain the plant nutrient composition.

9. The process according to claim 8, wherein the alkali is selected from the group consisting of sodium hydroxide and potassium hydroxide.

* * * * *

UNITED STATES PATENT AND TRADEMARK OFFICE
CERTIFICATE OF CORRECTION

| | |
|---|---|
| PATENT NO. | : 8,152,890 B2 |
| APPLICATION NO. | : 12/312337 |
| DATED | : April 10, 2012 |
| INVENTOR(S) | : Durga Yandapalli Prasad |

It is certified that error appears in the above-identified patent and that said Letters Patent is hereby corrected as shown below:

On the title page, item [54] and column 1, line 1:

Title, please replace "KIMBERLITE BASED FERTILIZER PRODUCTS" with

--NOVEL KIMBERLITE BASED FERTILIZER PRODUCTS--.

Signed and Sealed this
Thirty-first Day of July, 2012

David J. Kappos
*Director of the United States Patent and Trademark Office*